United States Patent [19]

Holladay

[11] 3,866,655

[45] Feb. 18, 1975

[54] TIRE CHANGER WITH IMPROVED TIRE CHANGING TOOL

[75] Inventor: Jimmie L. Holladay, Antioch, Tenn.

[73] Assignee: The Coats Company, Inc., LaVergne, Tenn.

[22] Filed: June 25, 1973

[21] Appl. No.: 373,490

[52] U.S. Cl. ............................................. 157/1.24
[51] Int. Cl. ............................................ B60c 25/06
[58] Field of Search.................... 157/1.22, 1.24, 1.3

[56] References Cited
UNITED STATES PATENTS

| 1,098,488 | 6/1914 | Pyar | 157/1.22 |
| 1,183,690 | 5/1916 | Stewart | 157/1.22 |
| 1,211,571 | 1/1917 | Goodrich | 157/1.22 |
| 3,791,434 | 2/1974 | Duquesne | 157/1.24 |
| 3,823,756 | 7/1974 | Rainey | 157/1.22 |

Primary Examiner—Al Lawrence Smith
Assistant Examiner—Harold P. Smith, Jr.
Attorney, Agent, or Firm—Wegner, Stellman, McCord, Wiles & Wood

[57] ABSTRACT

A tire changing apparatus of the type having a rotatable, rim-receiving table and an overhead tool movable into proximity with a rim on the table for mounting and demounting tires as the table and the rim are rotated. The tool includes an improved tool head having a duckhead shape including an inwardly directed concave recess for receiving the edge of the tire rim, a downwardly extending projection, and an upper bulbous portion. The upper surface of the bulbous portion guides the tire bead during a demounting operation while the lower side of the bulbous portion guides the tire bead below the upper edge of the tire during a tire mounting operation. The same minimizes the amount of force required to rotate the table, a rim and a tire associated therewith during a mounting operation by guiding the bead in such a way that less stretching forces are applied thereto. Also disclosed is a method of mounting a tire on a rim.

1 Claim, 5 Drawing Figures

PATENTED FEB 18 1975  3,866,655

TIRE CHANGER WITH IMPROVED TIRE CHANGING TOOL

BACKGROUND OF THE INVENTION

This invention relates to tire changing apparatus, and more particularly, to tire changing apparatus of the type having a rotatable rim gripping table and an overhead tool which is engaged with the tire during a tire mounting or demounting operation. Typical of the prior art includes the commonly assigned U.S. Pat. No. 3,493,030 to Strang et al.

Over the years there have been a variety of proposals of tire changing apparatus of the type having a rotatable, rim-receiving table and an overhead tire changing tool which is maintained stationary relative to a rim on the table and a tire as the tire and rim are rotated by the table for assisting in the mounting and demounting of tires.

Typically, the tool heads employed with such tools cannot be used for both a tire mounting and a tire demounting operation. That is, one tool head is used for a tire mounting operation while another is used for a tire demounting operation. The switching between heads for the two operations is time consuming and inefficient. Thus, there has been a need for an improved tool head that can be used for both mounting and demounting operations.

This need has been eliminated in recent times through the provision of tools that can be used for both operations. However, as far as is known to the applicant, such combination tools universally require two tool head elements, one normally in the form of a lug or the like and the other in the form of an adjacent roller. As a result, something less than an optimum simple construction has resulted.

Moreover, such tools have typically guided the bead of a tire during a tire mounting operation at a location above and outwardly of the edge of the tire rim with the result that the opposite portion of the bead must be relatively accurately located in the dropped center of the rim or else the rotatable table will stall, precluding successful completion of the tire mounting operation.

Even when the portion of the bead opposite the tool is properly positioned within the dropped center of the rim, difficulties in mounting a tire have presented themselves. As is well-known, the periphery of the bead of a tire is relatively constant due to the fact that steel cables are located therein. Because a tire mounting operation tends to exert forces on the bead that would cause the periphery to expand, and the same is of relatively fixed length, relatively large motors have been required to rotate the table to overcome the frictional forces developed between the tool and the tire. Thus, the cost of tire changing apparatus has been increased through the necessity of using such relatively large motors.

SUMMARY OF THE INVENTION

It is the principal object of the invention to provide a new and improved tire changing apparatus of the type having a rotatable rim-receiving table and an overhead tool for mounting and demounting tires.

More specifically, it is an object of the invention to provide an improved tool head consisting of a single element and which is operative to permit the use of smaller motors for the purpose of rotating a table during a tire mounting operation. It is also an object of the invention that such a tool head be capable of being used for both tire mounting and demounting operations.

Another object of the invention is to provide an improved method of mounting a tire so as to minimize the force requirement during such an operation.

The exemplary embodiment of the invention achieves the foregoing objects in a construction including a rotatable, rim-receiving table and a tool having a tool head configured in the shape of the head of a duck. The tool head includes a downwardly extending projection which also extends inwardly with reference to the table so as to define a concave area for receipt of the edge of a tire rim. The tool head also includes an upper, bulbous portion which projects outwardly with reference to the table. Below the bulbous portion and above the lower end of the downwardly extending projection is a further concave area which receives the bead of a tire during a mounting operation to guide the same on the rim such that the bead is below the upper edge of the rim for an apparatus wherein the table is mounted for rotation about an vertical axis.

Inwardly of the bulbous portion and above the same is still a further concave area which is adapted to receive and guide the bead of a tire during a demounting operation.

In the preferred embodiment, opposite sides of the downwardly extending projection include concave recesses for receipt of the tire bead. Additionally, the outer surface of the downwardly extending projection, with reference to the table, is rounded.

As a result of the foregoing construction, the bead of a tire to be mounted is located closer to the rim during a mounting process to minimize the forces tending to stretch the same and thereby permit easy mounting with lesser power requirements and with lesser concern for accurately locating an opposite portion of the bead within the dropped center of a conventional rim.

An improved method of mounting a tire rim through the use of the above tool includes the steps of partially placing a tire about a rim and establishing relative rotation between a tool and a partially mounted tire and rim while maintaining the bead of the tire in engagement with the tool and inwardly of a side of the rim.

Other objects and advantages will become apparent from the following specification taken in conjunction with the accompanying drawings.

DESCRIPTION OF THE PREFERRED EMBODIMENT

Figure 1:
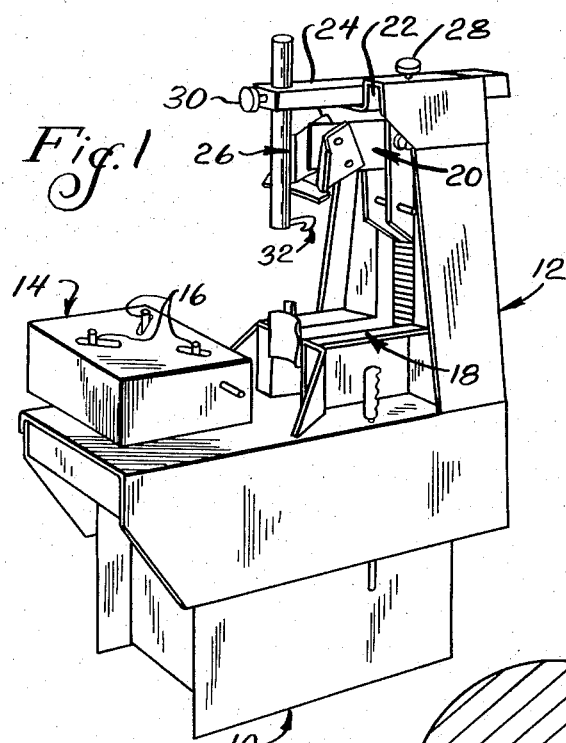
FIG. 1 is a perspective view of a tire changing apparatus embodying the invention.

With reference to FIG. 1, an exemplary embodiment of a tire changing apparatus made according to the invention is seen to include a base, generally designated 10, having an upright column, generally designated 12, on one side thereof. Opposite the upright column 12 is a tire changing table, generally designated 14, which is mounted for rotation by means not illustrated. Rim gripping lugs 16 extend from the upper surface of the table 14 for gripping a rim to hold the same stationary relative to the table 14 when the latter is rotated for mounting and demounting purposes.

Intermediate the table 14 and the column 12 is a support surface, generally designated 18, on which a rim having a tire thereon may be located so that an upper bead breaker assembly, generally designated 20, may be lowered to break the bead on the tire. If desired, and as disclosed in the above-identified Strang et al. U.S. Pat. No. 3,493,030, a lower bead breaker assembly (not shown) may be provided so as to break the lower bead on the tire at the same time the upper bead breaker assembly 20 is breaking the upper bead.

The upper end of the column 12 includes a channel member 22 slidably receiving a horizontally elongated arm 24 which, at one end thereof, mounts, for vertical movement, a tool, generally designated 26. Suitable clamping means, including a manual actuator 28, are provided to hold the arm 24 in any position of adjustment toward or away from the table 14 while similar clamping means including a knob 30 can be used to hold the tool 26 in any desired position of adjustment toward or away from the table 14 in a vertical direction. The tool 26 mounts a tool head, generally designated 28, at its lower end and by means of the adjustments provided, as mentioned above, the tool head 32 may be brought into a proper operative relation with respect to a tire and a rim mounted on the table 14 for mounting and demounting purposes.

Figure 2:
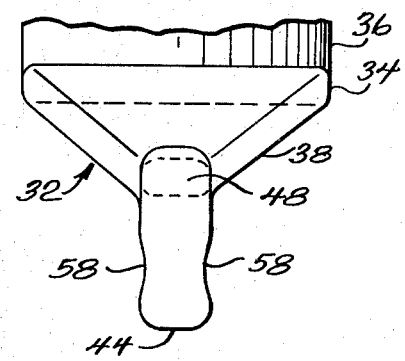
FIG. 2 is a side elevation of a tool head made according to the invention.
Figure 3:
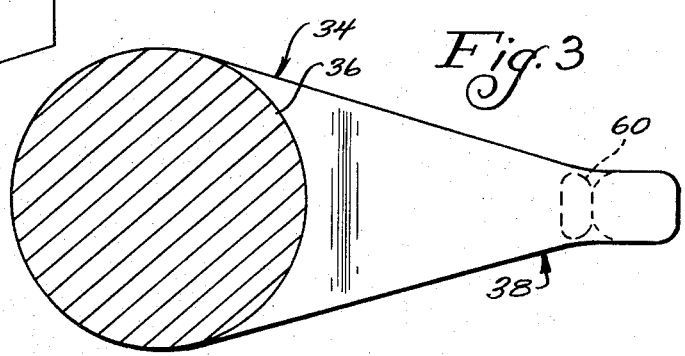
FIG. 3 is a plan view of the tool head.
Figure 4:
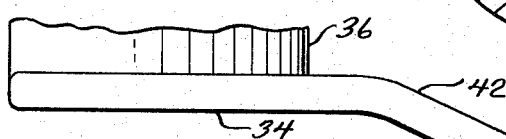
FIG. 4 is a side elevation of the tool head taken at 90° to the illustration of FIG. 2 and further illustrating the relationship of the same to a tire bead and a rim during a mounting process.
Figure 4:
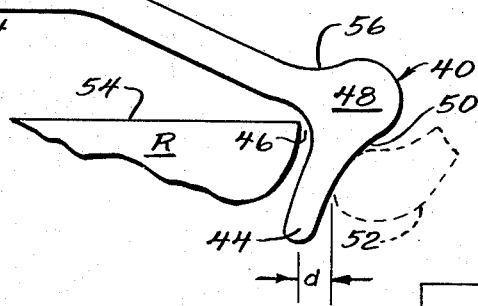

With reference now to FIGS. 2–4, inclusive, the tool head 32 will be described in greater detail. The same includes an enlarged end 34 in the form of a tear drop which is secured by any suitable means (not shown) to a post 36 forming part of the tool 26, which post is slidably received in the arm 24, as mentioned previously. The end of the tool head 32 opposite the end 34 is designated 38 and is considerably narrower than the end 34 and terminates in a configuration that appears in the form of a duckhead, generally designated 40, as best seen in FIG. 4. The end 34 is arranged to be relatively horizontal and intermediate the ends 34 and 38 is a bend 42. The presence of the bend 42 causes what amounts to the bill of the duckhead 40 to be a downwardly extending projection 44 which also extends inwardly with reference to the table 14 (not shown) and a rim R received thereon. The inward direction of the projection 44 defines a first concave area 46 for receiving the rim R, as seen in FIG. 4.

Upwardly and extending outwardly from the projection 44 is a bulbous portion 48 that defines the head proper of the duckhead 40. The same is configured so as to define intermediate its position and the lower end of the projection 44, a second concave area 50 which may be engaged by the bead of a tire shown in dotted lines at 52 for guiding the same onto the rim R during a tire mounting process. As can be observed from FIG. 4, the bead 52 is below the upper edge 54 of the rim R or, in other words, inwardly of the edge thereof.

The upper surface of the bulbous portion 48 is configured so that a third concave area 56 exists inwardly of the bulbous portion 48. The concave area 56 is adapted to receive the bead of a tire and guide the same during a tire demounting operation.

As best seen in FIG. 2, opposite sides of the downwardly extending projection 44 are provided with concave recesses 58 which also assist in guiding the bead 52 of a tire during a mounting operation. And, as best seen in FIG. 3, the outermost surface of the downwardly extending projection 44 (that facing away from the rim R) is rounded as at 60.

In use, when a tire is to be demounted, after the beads are broken, it is firmly located on the table 14 and by means of a pry bar or the like, one of the beads is pried away from the rim 14 above the same and located in the concave area 56. At this time, the table 14 with the rim firmly affixed thereto is rotated and the bead will be dislodged from the rim R.

When a tire is to be mounted on the rim, it is partially fitted about the rim in the conventional fashion with that portion of the tire adjacent the tool on one side thereof located within the confines of the rim. The tire bead 52 adjacent the tool is manually located in the concave area 50. At this time, the table 14 is rotated along with the rim and the tire and the tool head 32 will guide the bead onto the rim.

As generally alluded to previously, the use of a tool made according to the invention minimizes the power requirements for rotation of the table during a tire mounting operation. As is well-known, the beads of tires include internal metal cables and therefore are of a relatively fixed periphery. Because the same must be fitted about a rim, considerable forces tending to stretch the bead are developed and the greater such force, the greater the friction between the tool head and the tire, with the result that more force must be exerted to rotate the table. The instant invention minimizes the force requirements by reason of the fact that the edge of the bead, during a mounting operation, is much closer to the edge of the rim R and below the side of the same as illustrated in FIG. 4. The distance of separation is designated by a $d$ in FIG. 4.

In contrast, according to a prior art construction including a roller 100 and a lug 102, which guides the bead 52 at a position above the side 54 of the rim, a considerably greater distance of separation exists. This distance is illustrated at D in FIG. 5. While the apparent differences between the two distances $d$ and $D$ is generally only on the order of 1/16 – 1/8 of an inch, the savings represented through the use of a tool made according to the invention allows a considerably smaller motor to be employed for rotating the table 14. Thus, a less expensive motor may be used for the purpose with the result that a tire changing apparatus made according to the invention may be fabricated at a lesser cost than prior art devices.

Figure 5:
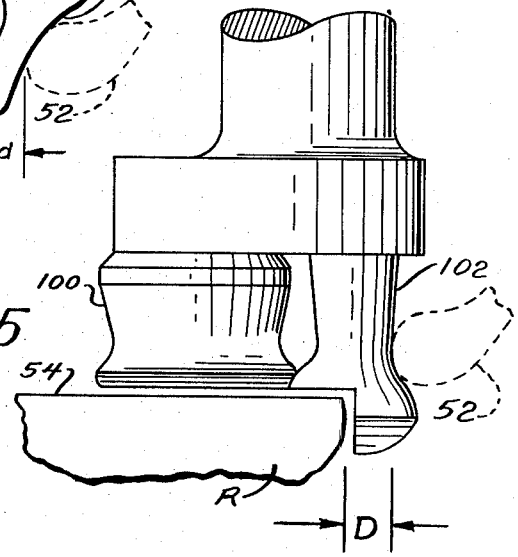
FIG. 5 is a side elevation of a tool head made according to the teachings of the prior art.

Moreover, as can be seen from a comparison of the structure illustrated in FIGS. 2–4, inclusive, and the prior art structure illustrated in FIG. 5, a tool head made according to the invention consists of a single element in contrast to the use of at least two in prior art constructions. This further simplifies the construction over those heretofore known, again minimizing cost.

Finally, it will also be observed that the single element tool made according to the invention can be used with equal facility for both mounting and demounting of tires.

I claim:

1. In a tire changing apparatus including a rotatable table on which a rim may be placed for rotation therewith for mounting or demounting a tire on the rim, a structure adjacent the table mounting extendable elements above the table including a tool haaving a tool head adapted to be brought in close proximity to the upper edge of a rim on the table for guiding the bead of a tire during a mounting or demounting operation, the improvement in said tool head comprising: a member having a downwardly extending projection, said projection also extending inwardly toward said table and defining a concave area in which the upper edge of a rim may be received, said downwardly extending projection including tire bead guiding recesses on opposite sides thereof, and an upper, outwardly extending, bulbous portion under which the bead of a tire to be mounted may be received and located so that the bead of the tire will be located below the upper edge of a rim on the table whereby the circumference of the bead of the tire need not be stretched during a mounting operation and whereby a portion of the tire bead opposite that in engagement with said tool need not be located on the dropped center of a rim on said table so that the force required to locate said table during a tire mounting operation is minimized, said downwardly extending projection further including a rounded surface remote from said table, and further including an additional concave area on the upper side of said bulbous portion and adjacent said table for receiving and guiding the bead of a tire during a tire demounting operation.

* * * * *